United States Patent
Stergiou

(10) Patent No.: US 8,880,443 B2
(45) Date of Patent: Nov. 4, 2014

(54) BDD VARIABLE REORDERING USING MULTIPLE COMPUTING DEVICES

(75) Inventor: Stergios Stergiou, East Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 273 days.

(21) Appl. No.: 13/569,784

(22) Filed: Aug. 8, 2012

(65) Prior Publication Data
US 2014/0046875 A1 Feb. 13, 2014

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

| | | |
|---|---|---|
| 2012/0089555 A1 | 4/2012 | Stergiou |
| 2012/0089556 A1 | 4/2012 | Stergiou |
| 2012/0089557 A1 | 4/2012 | Stergiou |
| 2012/0089558 A1 | 4/2012 | Stergiou |
| 2012/0089559 A1 | 4/2012 | Stergiou |
| 2012/0089560 A1 | 4/2012 | Stergiou |
| 2012/0089561 A1 | 4/2012 | Stergiou |

OTHER PUBLICATIONS

Ordered binary decision diagrams as knowledge-bases Takashi Horiyama , Toshihide Ibaraki Received Apr. 28, 2000; received in revised form Nov. 22, 2001.*
The Multiple Variable Order Problem for Binary Decision Diagrams: Theory and Practical Application Christoph Scholl Bernd Becker Andreas Brogle Published in: Design Automation Conference, 2001. Proceedings of the ASP-DAC 2001. Asia and South Pacific Meeting Date : Jan. 30, 2001-Feb. 2, 2001.*
Reasoning with ordered binary decision diagrams Takashi Horiyama, Toshihide Ibaraki Received Mar. 20, 2002; received inrevised form Jan. 28, 2004; accepted Feb. 2, 2004.*

* cited by examiner

*Primary Examiner* — Kakali Chaki
*Assistant Examiner* — Ababacar Seck
(74) *Attorney, Agent, or Firm* — Baker Botts L.L.P.

(57) ABSTRACT

In one embodiment, a first computing device selects k first variable orders for a Binary Decision Diagram (BDD) representing a function having n variables, where $n \geq 4$ and $k \geq 2$. The first computing device distributes the k first variable orders among a plurality of second computing devices. For each of the k first variable orders distributed to one of the second computing devices, the first computing device receives, from the one second computing device, a local best variable order among the first variable order and one or more second variable orders derived from the first variable order. The first computing device determines a global best variable order for the BDD among all local best variable orders received from the second computing devices.

21 Claims, 3 Drawing Sheets

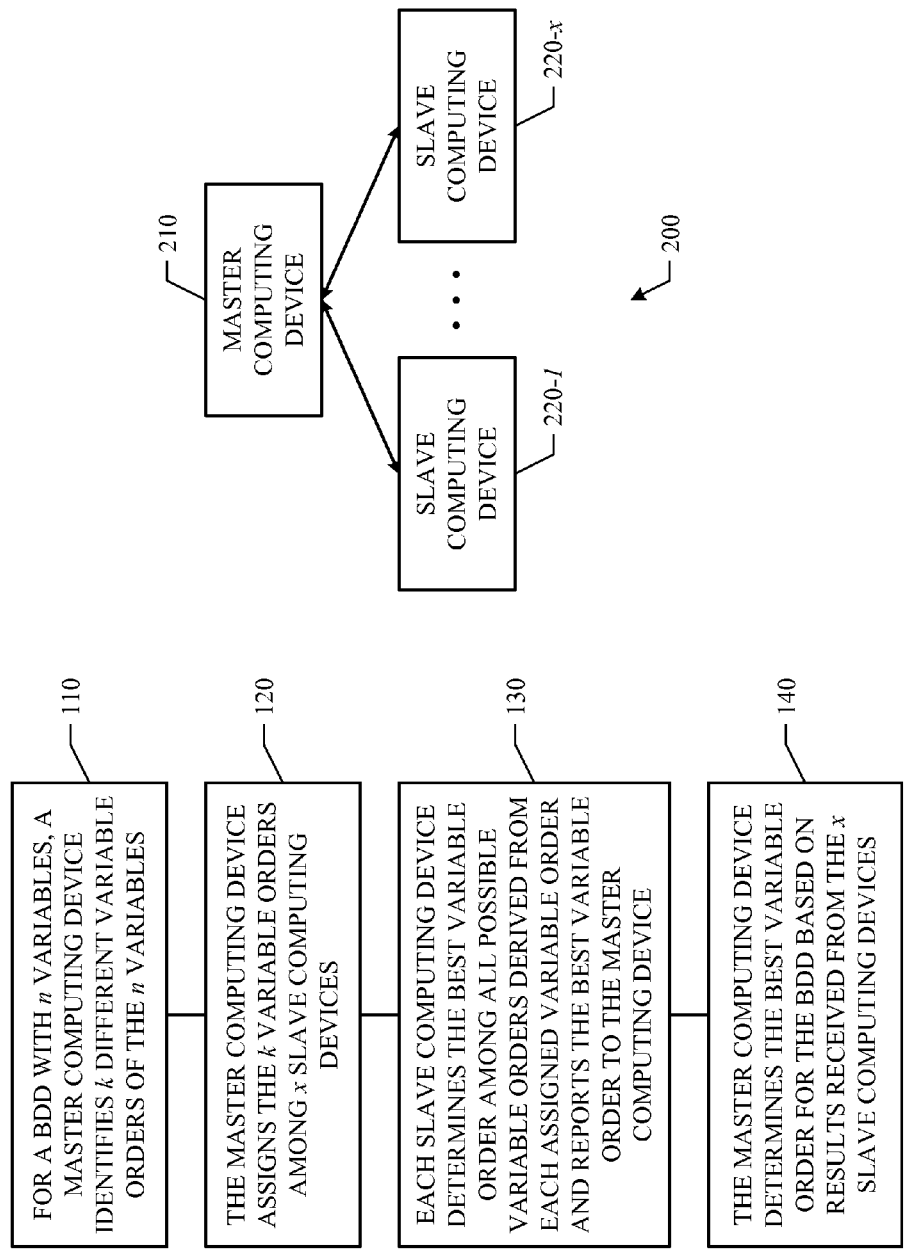

BDD VARIABLE REORDERING USING MULTIPLE COMPUTING DEVICES

TECHNICAL FIELD

This disclosure generally relates to binary decision diagrams (BDDs).

BACKGROUND

A Binary Decision Diagram (BDD) is a data structure that may be used to represent a Boolean function. A Reduced Ordered Binary Decision Diagram (ROBDD) is an optimized BDD that has no redundant nodes and isomorphic sub-graphs and that the variables appear in the same order along each path from root to a terminal node. The size of a BDD is determined by both the Boolean function it represents and the order of the variables of the function. Consequently, variable ordering exposes a critical optimization problem as the size of a BDD often varies greatly as its variable order changes.

SUMMARY

In particular embodiments, a first computing device selects k first variable orders for a Binary Decision Diagram (BDD) representing a function having n variables, where n≥4 and k≥2. The first computing device distributes the k first variable orders among a plurality of second computing devices. For each of the k first variable orders distributed to one of the second computing devices, the first computing device receives, from the one second computing device, a local best variable order among the first variable order and one or more second variable orders derived from the first variable order. The first computing device determines a global best variable order for the BDD among all local best variable orders received from the second computing devices. In particular embodiments, the global best variable order is the variable order that yields the smallest size of the BDD among all local best variable orders.

In particular embodiments, the k first variable orders for the BDD are selected by forming k groups respectively corresponding to the k first variable orders, each group including 2 ordered sets and a first set including s1 of the n variables and a second set including s2 of the n variables, where s1+s2=n; and for each group, combining the s1 variables in the first set and the s2 variables in the second set to form the corresponding first variable order, the s1 variables in the first set being positioned before the s2 variables in the second set.

In particular embodiments, when n is even, $$k = \binom{n}{\frac{n}{2}}, s1 = \frac{n}{2}, \text{ and } s2 = \frac{n}{2}.$$

When n is odd, $$k = \binom{n}{\lceil n/2 \rceil}, s1 = \lceil \frac{n}{2} \rceil,$$

and $$s2 = \lfloor \frac{n}{2} \rfloor.$$

Alternatively, when n is odd, $$k = \binom{n}{\lfloor n/2 \rfloor}, s1 = \lfloor \frac{n}{2} \rfloor,$$

and $$s2 = \lceil \frac{n}{2} \rceil.$$

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 1 illustrates an example method for determining an optimum or substantially optimal variable order of a Binary Decision Diagram (BDD).

FIG. 2 illustrates an example system for determining an optimum or substantially optimal variable order of a BDD.

DESCRIPTION OF EXAMPLE EMBODIMENTS

Figure 3:
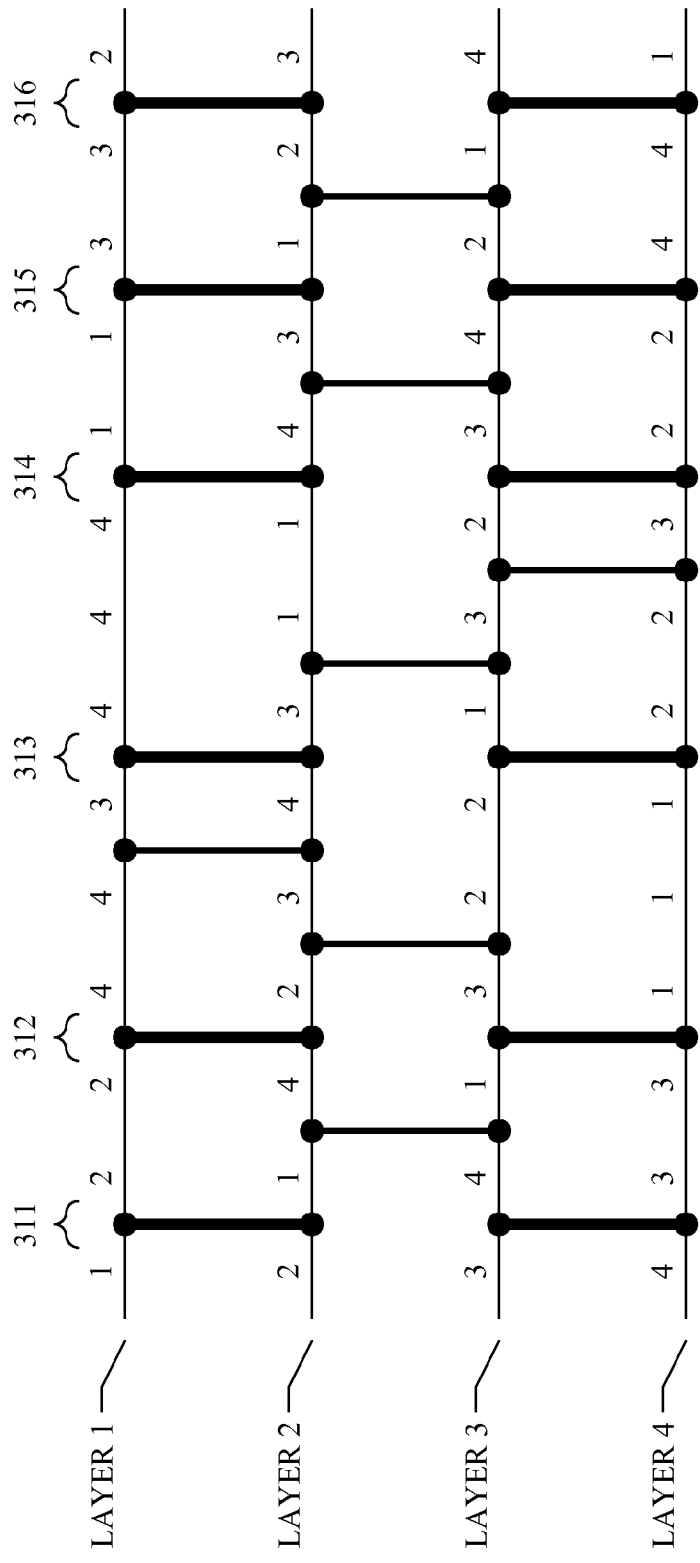
FIG. 3 illustrates example variable orders of a BDD with 4 variables.

A Binary Decision Diagram (BDD) is a data structure that may be used to represent a Boolean function. Given a Boolean function with n variables, $f(x_1, \ldots, x_n)$, the BDD representing this Boolean function also has n variables, corresponding to the n variables of the Boolean function. A BDD may be graphically represented as a rooted, directed, and acyclic graph having one or more internal decision nodes and two terminal nodes. The two terminal nodes are a FALSE or 0 terminal node and a TRUE or 1 terminal node. Each decision node (i.e., non-terminal node) corresponds to and represents a specific variable of the Boolean function and has two edges, a FALSE or 0 edge and a TRUE or 1 edge. Each edge may be connected to another decision node or to one of the terminal nodes.

Each path in the graph may by formed by one or more decision nodes and their associated edges, and eventually leads to either the 0 terminal node or the 1 terminal node. The decision nodes that form a particular path each represent a different variable of the Boolean function. That is, along a single path, no two decision nodes represent the same variable of the Boolean function. A path that leads to the 0 terminal node indicates that the Boolean function evaluates to FALSE for the values assigned to the variables represented by the decision nodes on that path; and a path that leads to the 1 terminal node indicates that the Boolean function evaluates to TRUE for the values assigned to the variables represented by the decision nodes on the path.

A BDD whose redundant decision nodes and isomorphic sub-graphs have been removed and whose decision nodes appear in the same order from the root to the terminal nodes along all the paths in the BDD is referred to as a Reduced Ordered Binary Decision Diagram (ROBDD). A ROBDD has two important properties. First, the ROBDD is ordered. That is, there is a fixed order $\pi\{1, \ldots, n\} \to \{x_1, \ldots, x_n\}$ such that for any non-terminal node v, index(low(v))=$\pi$(k) with k>$\pi^{-1}$(index(v)) and index(high(v))=$\pi$(q) with q>$\pi^{-1}$(index(v)) hold if low(v) and high(v) are also non-terminal nodes. Second, the ROBDD is reduced. That is, there exists no non-terminal node v∈V with low(v)=high(v) and there are no two non-terminal nodes V and v' such that the sub-BDDs rooted by v and v' are isomorphic. Note that in a BDD, a non-terminal node is a decision node. The graph representing a ROBDD with n variables has n layers, where each layer corresponds to a specific variable. The advantage of a ROBDD is that it is canonical for a particular function and variable order, which makes it useful in various types of practical applications.

The size of a BDD is determined by both the Boolean function it represents and the chosen order of the variables of the function. The size of a BDD is the sum of the sizes of all of its individual layers. In particular embodiments, the size of a BDD may be expressed in terms of the number of decision nodes in the BDD. Similarly, the size of a layer of a BDD may be expressed in terms of the number of decision nodes at that layer.

Given a Boolean function, $f(x_1, \ldots, x_n)$, represented by a BDD, depending upon the ordering of the variables, $x_1, \ldots, x_n$, the number of decision nodes in the graph representing the BDD is linear in the best case and exponential in the worst case, in terms of n. For example, for Boolean function $f(x_1, \ldots, x_{2n})=x_1x_2+x_3x_4+\ldots+x_{2n-1}x_{2n}$, using the variable order $x_1<x_3<\ldots<x_{2n-1}<x_2<x_4<\ldots<x_{2n}$, the BDD needs $2^{n+1}$ decision nodes to represent the Boolean function. On the other hand, using the variable order $x_1<x_2<x_3<x_4<\ldots<x_{2n-1}<x_{2n}$, the BDD only needs 2n decision nodes to represent the same Boolean function. As this example illustrates, variable ordering exposes a critical optimization problem for BDDs as the size of a BDD often varies greatly as its variable order changes.

Given a particular layer of a BDD representing a Boolean function, when a first variable of the Boolean function (e.g., $x_1$) is positioned at that layer, the layer may have one size. When a second variable of the Boolean function (e.g., $x_2$) is positioned at that same layer, the layer may have another, different size. In addition, given a particular layer (e.g., layer i) of a BDD with a particular variable (e.g., $x_i$) positioned at that layer, the size of the layer (e.g., layer i) in connection with the variable (e.g., $x_i$) depends on the specific variables positioned at layers above (e.g., layers i−1, i−2, . . . ) and below (e.g., layers i+1, i+2, . . . ) that particular layer (e.g., layer i). Thus, for example, for a BDD with 4 variables respectively positioned at 4 layers, if variable $x_3$ is positioned at layer 3, when variables $x_1$ and $x_2$ are respectively positioned at layers 1 and 2 and variable $x_4$ is positioned at layer 4, layer 3 in connection with variable $x_3$ may have one size. But when variables $x_4$ and $x_1$ are respectively positioned at layers 1 and 2 and variable $x_2$ is positioned at layer 4, layer 3 in connection with variable $x_3$ may have another, different size, even though variable $x_3$ remains at layer 3.

BDD variable ordering refers to the process of testing different variable orders of a BDD to determine the size of the BDD for each specific variable order. The goal of BDD variable ordering is, in general, to find an optimum or substantially optimal ordering of the function variables such that the number of decision nodes needed in a BDD is minimized, thus reducing the size of the BDD representing the function. In general, in order to find the optimum variable order of a BDD where the size of the BDD is minimum, it may be necessary to test many if not all possible order permutations of the variables of the BDD so that the order permutation of the variables where the size of the BDD is the smallest may be found. This specific order permutation yields the optimum variable order for the BDD. Note that each specific order permutation of the variables indicates a different variable order of the BDD. In practice, however, finding all possible order permutations of the variables of a BDD, and thus finding all possible variable orders of the BDD, may be very expensive in terms of time and resources it requires since, for a BDD that represents a Boolean function of n variables, there are n! (n factorial, where n!=1×2×. . . ×n) possible order permutations of the variables FIG. 1 illustrates an example method and FIG. 2 illustrates an example system 200 for determining an optimum or substantially optimal variable order of a BDD with n variables. These two figures are described in connection with each other.

In particular embodiments, system 200 may include a master computing device 210 and x slave computing devices 220-1 . . . 220-x. Note that x may be any positive number.

In particular embodiments, given a BDD with n variables, which has n! possible variable orders, at 110, master computing device 210 may select, from among the n! possible variable orders, k specific variable orders, where 1≤k≤n!. For clarification purposes, these k selected variable orders are referred to as "worker" variable orders.

More specifically, in particular embodiments, when n is an even number (i.e., n is divisible by 2) and n≥4, the k worker variable orders may be selected by forming k unique groups, where each group includes 2 ordered sets and each set includes $$\frac{n}{2}$$

variables. Each group corresponds to a specific worker variable order, where the worker variable order is the combination of the 2 ordered sets of $$\frac{n}{2}$$

variables from the corresponding group. As an example, for the case of n=4, there exists $$6\left(k = \binom{4}{2} = 6\right)$$

possible ways to separate {1, 2, 3, 4} into 6 unique groups of 2 ordered sets where each set includes $$2\left(i.e., \frac{4}{2} = 2\right)$$

variables. The following are the 4 variables separated into 6 unique groups, where each group includes 2 ordered sets and each set includes 2 variables, and these 6 groups correspond to the 6 worker variable orders selected for a BDD with 4 variables:

{1, 2} {3, 4}→1, 2, 3, 4
{1, 3} {2, 4}→1, 3, 2, 4
{1, 4} {2, 3}→1, 4, 2, 3
{2, 3} {1, 4}→2, 3, 1, 4
{2, 4} {1, 3}→2, 4, 1, 3
{3, 4} {1, 2}→3, 4, 1, 2

Note that within each group of 2 ordered sets of $$\frac{n}{2}$$

variables, each variable only appears once. That is, if a variable appears in the first set, then it does not appear in the second set. Conversely, if a variable appears in the second set, then it does not appear in the first set. In the context of forming worker variable orders, within each set of variables in each group, the order of the variables is irrelevant. Thus, $\{1, 2\}$ is considered the same as $\{2, 1\}$. However, within each group of 2 ordered sets, the order of the sets matters. Thus, $[\{1, 2\} \{3, 4\}]$ is not considered the same as $[\{3, 4\} \{1, 2\}]$. This is why each group includes 2 "ordered" sets of variables. Therefore, there exists $$k = \binom{n}{n/2}\left(n \text{ choose}\frac{n}{2}\right)$$

worker variable orders for a BDD with n variables.

As another example, for the case of n=6, there exists $$k = \binom{6}{3} = 20$$

groups, where each group includes 2 ordered sets and each set includes 3 variables. Thus, for a BDD with 6 variables, there are 20 worker variable orders, each corresponding to a group and being a combination of the 2 ordered sets from the corresponding group. The following are some of the worker variable orders selected for a BDD with 6 variables:

$\{1, 2, 3\}$ $\{4, 5, 6\} \rightarrow 1, 2, 3, 4, 5, 6$
$\{1, 3, 4\}$ $\{2, 5, 6\} \rightarrow 1, 3, 4, 2, 5, 6$
$\{2, 4, 5\}$ $\{1, 3, 6\} \rightarrow 2, 4, 5, 1, 3, 6$
$\{4, 5, 6\}$ $\{1, 2, 3\} \rightarrow 4, 5, 6, 1, 2, 3$
$\{2, 5, 6\}$ $\{1, 3, 4\} \rightarrow 2, 5, 6, 1, 3, 4$
$\{3, 4, 5\}$ $\{1, 2, 6\} \rightarrow 3, 4, 5, 1, 3, 6$
. . .

As a third example, for the case of n=8, there exists $$k = \binom{8}{4} = 70$$

groups, where each group includes 2 ordered sets and each set includes 4 variables. Thus, for a BDD with 8 variables, there are 70 worker variable orders. The following are some of the worker variable orders selected for a BDD with 8 variables:

$\{1, 2, 3, 4\}$ $\{5, 6, 7, 8\} \rightarrow 1, 2, 3, 4, 5, 6, 7, 8$
$\{1, 2, 3, 5\}$ $\{4, 6, 7, 8\} \rightarrow 1, 2, 3, 5, 4, 6, 7, 8$
$\{1, 2, 3, 6\}$ $\{4, 5, 7, 8\} \rightarrow 1, 2, 3, 6, 4, 5, 7, 8$
$\{3, 6, 7, 8\}$ $\{1, 2, 4, 5\} \rightarrow 3, 6, 7, 8, 1, 2, 4, 5$
. . .

In particular embodiments, when n is an odd number and n≥5, the k worker variable orders may be selected by forming k unique groups, where each group includes 2 ordered sets. However, in this case, since n is not divisible by 2, there is an extra variable, which may be included in either one of the 2 ordered sets for each group. Thus, within each group, one set includes $$\left\lfloor \frac{n}{2} \right\rfloor$$

variables and the other set includes $$\left\lceil \frac{n}{2} \right\rceil$$

variables. Either the first set or the second set may include the extra variable. However, if the first set is to have the extra variable, then for all groups corresponding to worker variable orders, the first set in each group always has the extra variable. Conversely, if the second set is to have the extra variable, then for all groups corresponding to worker variable orders, the second set in each group always has the extra variable. If the extra variable is included in the first set, then $$k = \binom{n}{\lceil \frac{n}{2} \rceil}.$$

If the extra variable is included in the second set, then $$k = \binom{n}{\lfloor \frac{n}{2} \rfloor}.$$

The number of worker variable orders, k, is the same whether the extra variable is included in the first set or the second set. Again, each group corresponds to a specific worker variable order, where the worker variable order is the combination of the 2 ordered sets of $$\left\lfloor \frac{n}{2} \right\rfloor$$

and $$\left\lceil \frac{n}{2} \right\rceil$$

variables, respectively, from the corresponding group.

As an example, for the case of n=5, there $$k = \binom{5}{2} = \binom{5}{3} = 10$$

worker variable orders. Suppose that the extra variable is included in the second set (i.e., the first set includes 2 variables and the second set includes 3 variables), the following are some of the worker variable orders selected for a BDD with 5 variables:

$\{1, 2\}$ $\{3, 4, 5\} \rightarrow 1, 2, 3, 4, 5$
$\{1, 5\}$ $\{2, 3, 4\} \rightarrow 1, 5, 2, 3, 4$
$\{2, 3\}$ $\{1, 4, 5\} \rightarrow 2, 3, 1, 4, 5$
$\{4, 5\}$ $\{1, 2, 3\} \rightarrow 4, 5, 1, 2, 3$
. . .

As another example, for the case of n=7, there $$k = \binom{7}{3} = \binom{7}{4} = 35$$

worker variable orders. Suppose that the extra variable is included in the first set (i.e., the first set includes 4 variables and the second set includes 3 variables), the following are some of the worker variable orders selected for a BDD with 7 variables:

{1, 2, 3, 4} {5, 6, 7}→1, 2, 3, 4, 5, 6, 7
{2, 3, 6, 7} {1, 4, 5}→2, 3, 6, 7, 1, 4, 5
{3, 4, 5, 6} {1, 2, 7}→3, 4, 5, 6, 1, 2, 7
{1, 4, 5, 7} {2, 3, 6}→1, 4, 5, 7, 2, 3, 6
. . .

As these examples illustrate, as the number of variables of a BDD (i.e., n) increases, the number of worker variable orders (i.e., k) increases rapidly.

In particular embodiments, at 120, master computing device 210 may distribute the k worker variable orders among slave computing devices 220-1 to 220-x, such that each slave computing device 220-i is assigned at least one of the k worker variable orders. At 130, each slave computing device 220-i may determine the best local variable order among all possible variable orders derived from the worker variable order assigned to that slave computing device 220-i and reports that best local variable order back to master computing device 210. In particular embodiments, the variable orders derived from a specific worker variable order may be a subset of variable orders of the BDD.

Using the case of a BDD with 4 variables and 6 worker variable orders (i.e., n=4 and k=6) as an example, slave computing device 220-1 may be assigned worker variable order [1, 2, 3, 4]; slave computing device 220-2 may be assigned worker variable order [1, 3, 2, 4]; and so on. If there are 6 slave computing devices (i.e., x=6), then each salve computing device is assigned one worker variable order.

For slave computing device 220-1, which has been assigned worker variable order [1, 2, 3, 4] (from 2 ordered sets {1, 2} and {3, 4}), it is responsible for determining the best permutation of the 4 variables (i.e., the best variable order) among [1, 2, 3, 4], [2, 1, 3, 4], [1, 2, 4, 3], and [2, 1, 4, 3]. These 4 variable orders are derived from worker variable order [1, 2, 3, 4] by swapping the variables within each of the 2 ordered sets (i.e., {1, 2} and {3, 4}) in the group corresponding to worker variable order [1, 2, 3, 4]. Each specific variable order results in a corresponding size of the BDD, and the best variable order is the one that results in the smallest size of the BDD among the 4 sizes. Since this is the best variable order only among the 4 variable orders derived from worker variable order [1, 2, 3, 4], for clarification purposes, it is referred to as a "local" best variable order. Slave computing device 220-1 may report the local best variable order and the corresponding size of the BDD determined for worker variable order [1, 2, 3, 4] to master computing device 210.

For slave computing device 220-2, which has been assigned worker variable order [1, 3, 2, 4] (from 2 ordered sets {1, 3} and {2, 4}), it is responsible for determining the local best variable order among [1, 3, 2, 4], [3, 1, 2, 4], [1, 3, 4, 2], and [3, 1, 4, 2]. Similarly, these 4 variable orders are derived from worker variable order [1, 3, 2, 4] by swapping the variables within each of the 2 ordered sets (i.e., {1, 3} and {2, 4}) in the group corresponding to worker variable order [1, 3, 2, 4]. Again, each specific variable order results in a corresponding size of the BDD, and the local best variable order is the one that results in the smallest size of the BDD among the 4 sizes. Slave computing device 220-2 may report the local best variable order and the corresponding size of the BDD determined for worker variable order [1, 3, 2, 4] to master computing device 210.

For slave computing device 220-3, which has been assigned worker variable order [1, 4, 2, 3] (from 2 ordered sets {1, 4} and {2, 3}), it is responsible for determining the local best variable order among [1, 4, 2, 3], [4, 1, 2, 3], [1, 4, 3, 2], and [4, 1, 3, 2]. These 4 variable orders are derived from worker variable order [1, 4, 2, 3] by swapping the variables within each of the 2 ordered sets (i.e., {1, 4} and {2, 3}) in the group corresponding to worker variable order [1, 4, 2, 3]. Each specific variable order results in a corresponding size of the BDD, and the local best variable order is the one that results in the smallest size of the BDD among the 4 sizes. Slave computing device 220-3 may report the local best variable order and the corresponding size of the BDD determined for worker variable order [1, 4, 2, 3] to master computing device 210.

For slave computing device 220-4, which has been assigned worker variable order [2, 3, 1, 4] (from 2 ordered sets {2, 3,} and {1, 4}), it is responsible for determining the local best variable order among [2, 3, 1, 4], [3, 2, 1, 4], [2, 3, 4, 1], and [3, 2, 4, 1]. These 4 variable orders are derived from worker variable order [2, 3, 1, 4] by swapping the variables within each of the 2 ordered sets (i.e., {2, 3} and {1, 4}) in the group corresponding to worker variable order [2, 3, 1, 4]. Each specific variable order results in a corresponding size of the BDD, and the local best variable order is the one that results in the smallest size of the BDD among the 4 sizes. Slave computing device 220-4 may report the local best variable order and the corresponding size of the BDD determined for worker variable order [2, 3, 1, 4] to master computing device 210.

For slave computing device 220-5, which has been assigned worker variable order [2, 4, 1, 3] (from 2 ordered sets {2, 4,} and {1, 3}), it is responsible for determining the local best variable order among [2, 4, 1, 3], [4, 2, 1, 3], [2, 4, 3, 1], and [4, 2, 3, 1]. These 4 variable orders are derived from worker variable order [2, 4, 1, 3] by swapping the variables within each of the 2 ordered sets (i.e., {2, 4,} and {1, 3}) in the group corresponding to worker variable order [2, 4, 1, 3]. Each specific variable order results in a corresponding size of the BDD, and the local best variable order is the one that results in the smallest size of the BDD among the 4 sizes. Slave computing device 220-5 may report the local best variable order and the corresponding size of the BDD determined for worker variable order [2, 4, 1, 3] to master computing device 210.

For slave computing device 220-6, which has been assigned worker variable order [3, 4, 1, 2] (from 2 ordered sets {3, 4,} and {1, 2}), it is responsible for determining the local best variable order among [3, 4, 1, 2], [4, 3, 1, 2], [3, 4, 2, 1], and [4, 3, 2, 1]. These 4 variable orders are derived from worker variable order [3, 4, 1, 2] by swapping the variables within each of the 2 ordered sets (i.e., {3, 4,} and {1, 2}) in the group corresponding to worker variable order [3, 4, 1, 2]. Each specific variable order results in a corresponding size of the BDD, and the local best variable order is the one that results in the smallest size of the BDD among the 4 sizes. Slave computing device 220-6 may report the local best variable order and the corresponding size of the BDD determined for worker variable order [3, 4, 1, 2] to master computing device 210.

As this example illustrates, each slave computing device 220-i determines a local best variable order for a subset of variable orders of the BDD. However, all possible variable orders of the BDD are eventually tested.

To generalize, in particular embodiments, for a BDD with n variables and k worker variable orders, each worker variable order is assigned to a slave computing device 220-i. Slave computing device 220-i is responsible for determining a local best variable order among the variable orders derived from the worker variable order assigned to it, including the worker variable order itself, by swapping the variables within each of the 2 ordered sets of variables from the group corresponding to the worker variable order. For each of the 2 ordered sets of variables within a specific group corresponding to a worker variable order, all possible variable orders are considered. However, the order of the 2 sets within each group remains fixed. Slave computing device 220-i reports the local best variable order and its corresponding size of the BDD, which is determined for a worker variable order assigned to it, to master computing device 210.

As another example, for a BDD with 6 variables and 20 worker variable orders (i.e., n=6 and k=20), each worker variable order corresponds to a group of 2 ordered sets where each set has 3 variables. One of these worker variable orders is [1, 3, 4, 2, 5, 6], which corresponds to the 2 ordered sets {1, 3, 4} and {2, 5, 6}. When this worker variable order is assigned to a slave computing device 220-i, slave computing device 220-i is responsible for determining the local best variable order among the 36 variable orders derived from this worker variable order, including the worker variable order itself. In this case, to derive variable orders from a worker variable order, all possible permutations of the 3 variables in the first set as well as all possible permutations of the 3 variables in the second set are considered. From the first set, the permutations of the 3 variables include {1, 3, 4}, {1, 4, 3}, {3, 1, 4}, {3, 4, 1}, {4, 1, 3}, and {4, 3, 1}. From the second set, the permutations of the 3 variables include {2, 5, 6}, {2, 6, 5}, {5, 2, 6}, {5, 6, 2}, {6, 2, 5}, and {6, 5, 2}. The variable orders derived from the worker variable order are obtained by forming combinations of the 3 variables from the first set and the 3 variables from the second set in various orders. Thus, one combination may be [1, 4, 3, 5, 2, 6] and another combination may be [4, 1, 3, 2, 6, 5] and so on. The local best variable order among the 36 variable orders thus derived from the worker variable order and its corresponding size of the BDD are determined and reported to master computing device 210.

Again, to generalize, in particular embodiments, for a BDD with n variables and k worker variable orders, each worker variable order corresponds to a combination of 2 ordered sets. When n is even, each set has $$\frac{n}{2}$$

variables. When n is odd, one set has $$\lfloor \frac{n}{2} \rfloor$$

variables and the other set has $$\lceil \frac{n}{2} \rceil$$

variables. It does not matter whether the first set or the second set has an extra variable. For example, suppose that a worker variable order is a combination of the 2 ordered variable sets $\{x_1, \ldots, x_m\}$ and $\{x_{m+1}, \ldots, x_n\}$, where $$m = \frac{n}{2}.$$

To derive additional variable orders from this worker variable order, all possible permutations of variables $x_1, \ldots, x_m$ in the first set may be obtained. Similarly, all possible permutations of variables $x_{m+1}, \ldots, x_n$ are obtained. The additional variable orders are derived by combining permutations of the variables in the first set with permutations of the variables in the second set in various ways. Note that the variables in the first set are always positioned before the variables in the second set when forming the additional variable orders.

In particular embodiments, a slave computing device 220-i may determine the local best variable order and its corresponding size of the BDD among the variable orders derived from a worker variable order assigned to it using any applicable means.

Using the above case of the BDD with 4 variables and 6 worker variable orders (i.e., n=4 and k=6) as an example, one of the worker variable orders in this case is [1, 2, 3, 4], corresponding to the 2 ordered sets {1, 2} and {3, 4}. Slave computing device 220-1 assigned to this worker variable order needs to determine the local best variable order among variable orders [1, 2, 3, 4], [2, 1, 3, 4], [1, 2, 4, 3], and [2, 1, 4, 3]. The size of a BDD may be expressed as the sum of the sizes of all the layers in the BDD. In addition, swapping two neighboring (i.e., consecutive) layers does not affect the sizes of the layers above or below these two layers. Thus, with some implementations, slave computing device 220-1 may receive the 4-variable BDD from master computing device 210, record the sum of layers 1 and 2 and the sum of layers 3 and 4. Then, slave computing device 220-1 may swap layers 1 and 2 and swap layers 3 and 4, and record the sum of layers 2 and 1 and the sum of layers 4 and 3. To obtain the size of the BDD for variable order [1, 2, 3, 4], slave computing device 220-1 may determine the sum of layers 1 and 2 and the sum of layers 3 and 4. To obtain the size of the BDD for variable order [2, 1, 3, 4], slave computing device 220-1 may determine the sum of layers 2 and 1 and the sum of layers 3 and 4. To obtain the size of the BDD for variable order [1, 2, 4, 3], slave computing device 220-1 may determine the sum of layers 1 and 2 and the sum of layers 4 and 3. To obtain the size of the BDD for variable order [2, 1, 4, 3], slave computing device 220-1 may determine the sum of layers 2 and 1 and the sum of layers 4 and 3. The variable order that has the smallest size is the local best variable order. The other slave computing devices 220 may perform similar operations with worker variable orders respectively assigned to them.

There are various optimization techniques for determining the sizes of a BDD with specific variable orders. With some implementations, a slave computing device 220-i may employ any applicable optimization techniques when determining the local best variable order and its corresponding size of the BDD among the variable orders derived from a worker variable order assigned to it. U.S. Patent Publication 2012-0089557 A1 entitled "Determining Optimum Variable Orders for BDDs Using Pair-Wise Variable Grouping" describes various optimization techniques for reordering BDD variables, which is hereby incorporated by reference in its entirety and for all purposes.

Again, using the above case of the BDD with 4 variables and 6 worker variable orders (i.e., n=4 and k=6) as an example, there are a total of 4 variable orders derived from each worker variable order, including the worker variable order itself, so that there are a total of 24 possible variable orders for a 4-variable BDD. Each worker variable order is a combination of 2 ordered sets of 2 variables each (e.g., {1, 2} {3, 4}→[1, 2, 3, 4]). When selecting worker variable orders, the order of the two sets matters. The variables from the first set are positioned before the variables from the second set. However, within each set, the order of the variables is irrelevant (e.g., {1, 2} is considered the same as {2, 1}). Thus, variable order [3, 4, 2, 1] is considered the same as variable order [3, 4, 1, 2] in the context of selecting worker variable orders, and either one may be selected as a worker variable order (i.e., they are interchangeable in the context of forming a worker variable order). On the other hand, [3, 4, 2, 1] and [2, 1, 3, 4] are not considered the same in the context of selecting worker variable orders.

FIG. 3 illustrates an example 4-variable BDD with 6 worker variable orders 311, 312, 313, 314, 315, 316. Some of these worker variable orders differ slightly from the 6 worker variable orders described above for the 4-variable BDD. For example, instead of using [3, 4, 1, 2] as a worker variable order, [3, 4, 2, 1] is used. Instead of using [1, 4, 2, 3] as a worker variable order, [4, 1, 2, 3] is used. And so on. In this case, by selecting these specific 6 worker variable orders 311, 312, 313, 314, 315, 316 and place them in the specific order illustrated in FIG. 3, it minimizes the number of variable swaps needed to be performed to go from one worker variable order to another worker variable order. As illustrated in FIG. 3, to go from worker variable order 311 [1, 2, 3, 4] to worker variable order 312 [2, 4, 1, 3], only 3 swaps are needed: between layers 1 and 2, between layers 3 and 4, and between layers 2 and 3. Moreover, layers 1 and 2 and layers 3 and 4 may be swapped concurrently, since each layer swap does not affect the other layer swap. To go from worker variable order 312 [2, 4, 1, 3] to worker variable order 313 [3, 4, 2, 1], 4 swaps are needed: between layers 1 and 2, between layers 3 and 4, between layers 2 and 3, and between layers 1 and 2. Again, layers 1 and 2 and layers 3 and 4 may be swapped concurrently. And so on, as the sequence of swaps illustrated in FIG. 3. Given a 4-variable BDD with an initial variable order of [1, 2, 3, 4], each slave computing device 220-i only needs to perform the variable swaps necessary to go from the worker variable order assigned to it to the next worker variable order along the sequence illustrated in FIG. 3.

This optimization technique, together with several other optimization techniques for BDD variable reordering, are described in more detail in U.S. Patent Publication 2012-0089557 A1.

When master computing device 210 distributes the k worker variable orders to slave computing devices 220-1 to 220-x, in particular embodiments, master computing device 210 may take into consideration the current workload of each slave computing devices 220-i. As an example, master computing device 210 may assign one worker variable order to one slave computing device 220-i at a time. When a specific slave computing device 220-i finishes determining the local best variable order among the variable orders derived from the worker variable order assigned to it and reports the result back to master computing device 210, master computing device 210 may assign another worker variable order to that slave computing device 220-i. This process may be repeated until all k worker variable orders have been assigned. As another example, master computing device 210 may distribute the k worker variable orders somewhat evenly among the x slave computing devices 220-1 to 220-x (e.g., each slave computing device 220-i is assigned approximately $$\frac{k}{x}$$

worker variable orders).

In particular embodiments, at 140, after collecting all the local best variable orders and their corresponding sizes of the BDD from slave computing devices 220-1 to 220-x, master computing device 210 may determine a global best variable order among the local best variable orders, which is the variable order that yields the smallest size of the BDD among the sizes corresponding to the local best variable order.

Particular embodiments may repeat the operations of the method of FIG. 1, where appropriate. Moreover, although this disclosure describes and illustrates particular operations of the method of FIG. 1 as occurring in a particular order, this disclosure contemplates any suitable operations of the method of FIG. 1 occurring in any suitable order. Furthermore, although this disclosure describes and illustrates particular components, devices, or systems carrying out particular operations of the method of FIG. 1, this disclosure contemplates any suitable combination of any suitable components, devices, or systems carrying out any suitable operations of the method of FIG. 1.

Although FIG. 2 illustrates master computing device 210 and slave computing devices 220 as separate devices performing separate functions, in particular embodiments, a specific computing device may implement functions of both master and slave computing devices. In this case, the computing device may assign one or more worker variable orders to itself, in addition to assigning worker variable orders to other slave computing devices, and determine the local best variable order for variable orders derived from each worker variable order assigned to itself. After receiving the results from other slave computing devices, the computing device may select a global best variable order of the BDD among all the local best variable orders, including those it has determined itself and those it has received from other slave computing devices.

Figure 4:
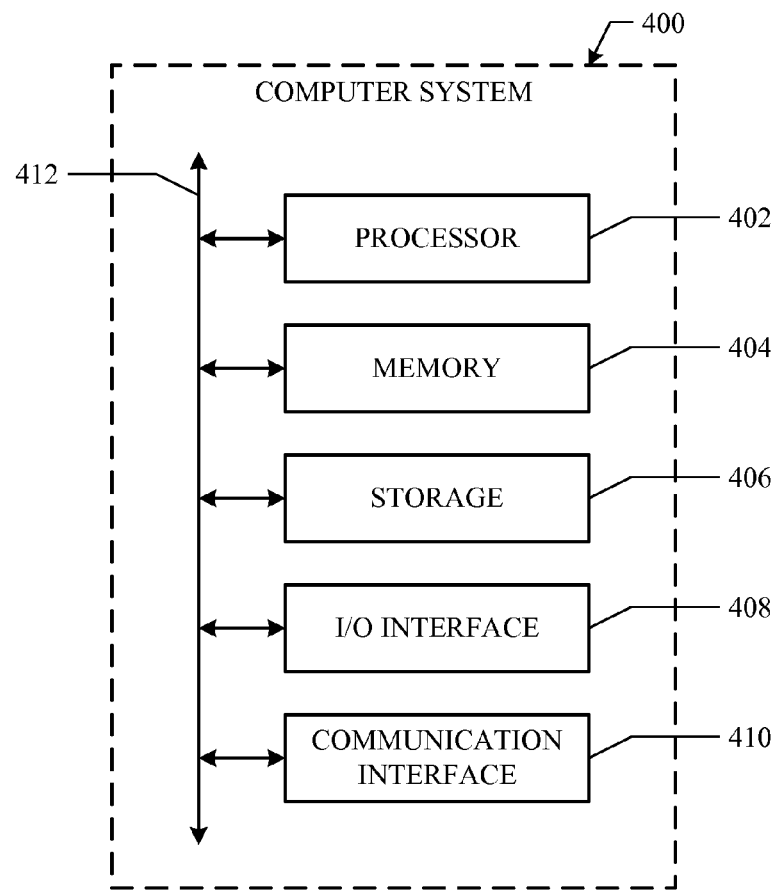
FIG. 4 illustrates an example computing device.

FIG. 4 illustrates an example computing system 400, which may be suitable for implementing a master or slave computing device. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive ("HDD"), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate. This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A method, performed by a first computing device, comprising:
    selecting k first variable orders for a Binary Decision Diagram (BDD) representing a function having n variables, where n≥4 and k≥2;
    distributing the k first variable orders among a plurality of second computing devices;
    for each of the k first variable orders distributed to one of the second computing devices, receiving, from the one second computing device, a local best variable order among the first variable order and one or more second variable orders derived from the first variable order; and
    determining a global best variable order for the BDD among all local best variable orders received from the second computing devices;
    wherein selecting the k first variable orders for the BDD comprises:
        forming k groups respectively corresponding to the k first variable orders, each group including 2 ordered sets and a first set including s1 of the n variables and a second set including s2 of the n variables, where s1+s2=n; and
        for each group, combining the s1 variables in the first set and the s2 variables in the second set to form the corresponding first variable order, the s1 variables in the first set being positioned before the s2 variables in the second set.

2. The method of claim 1, wherein for each group, forming the 2 ordered sets comprises:
    selecting s1 unique variables from the n variables for the first set; and
    including the remaining s2 variables from the n variables in the second set.

3. The method of claim 1, wherein when n is even, $$k = \binom{n}{n/2}, s1 = \frac{n}{2},$$

and $$s2 = \frac{n}{2}.$$

4. The method of claim 1, wherein when n is odd, $$k = \binom{n}{\lceil n/2 \rceil}, s1 = \lceil \frac{n}{2} \rceil,$$

and $$s2 = \lfloor \frac{n}{2} \rfloor.$$

5. The method of claim 1, wherein when n is odd, $$k = \binom{n}{\lfloor n/2 \rfloor}, s1 = \lfloor \frac{n}{2} \rfloor,$$

and $$s2 = \lceil \frac{n}{2} \rceil.$$

6. The method of claim 1, wherein for each of the first variable orders, deriving the second variable orders from first variable order comprises:
    deriving one or more third sets based on the first set from the corresponding group by permutating the s1 variables in the first set according to one or more orders, each third set including the s1 variables in a different order;
    deriving one or more fourth sets based on the second set from the corresponding group by permutating the s2 variables in the second set according to one or more orders, each fourth set including the s2 variables in a different order; and
    forming each of the second variable order by combining one of the third sets with one of the fourth sets, the s1 variables in the third set being positioned before the s2 variables in the fourth set.

7. The method of claim 1, wherein the k first variable orders among the second computing devices comprises
    iteratively distributing one of the first variable orders to one of the second computing devices that is currently available, until all first variable orders have been distributed.

8. A system comprising:
    a memory comprising instructions executable by one or more processors; and
    the one or more processors coupled to the memory and operable to execute the instructions, the instructions causing the one or more processors to perform:
        selecting k first variable orders for a Binary Decision Diagram (BDD) representing a function having n variables, where n≥4 and k≥2;
        distributing the k first variable orders among a plurality of second computing devices;
        for each of the k first variable orders distributed to one of the second computing devices, receiving, from the one second computing device, a local best variable order among the first variable order and one or more second variable orders derived from the first variable order; and
        determining a global best variable order for the BDD among all local best variable orders received from the second computing devices;
        wherein selecting the k first variable orders for the BDD comprises:
            forming k groups respectively corresponding to the k first variable orders, each group including 2 ordered sets and a first set including s1 of the n variables and a second set including s2 of the n variables, where s1+s2=n; and
            for each group, combining the s1 variables in the first set and the s2 variables in the second set to form the corresponding first variable order, the s1 variables in the first set being positioned before the s2 variables in the second set.

9. The system of claim 8, wherein for each group, forming the 2 ordered sets comprises:
    selecting s1 unique variables from the n variables for the first set; and
    including the remaining s2 variables from the n variables in the second set.

10. The system of claim 8, wherein when n is even, $$k = \binom{n}{n/2}, s1 = \frac{n}{2},$$

and $$s2 = \frac{n}{2}.$$

11. The system of claim 8, wherein when n is odd, $$k = \binom{n}{\lceil n/2 \rceil}, s1 = \lceil \frac{n}{2} \rceil,$$

and $$s2 = \lfloor \frac{n}{2} \rfloor.$$

12. The system of claim 8, wherein when n is odd, $$k = \binom{n}{\lfloor n/2 \rfloor}, s1 = \lfloor \frac{n}{2} \rfloor,$$

and $$s2 = \lceil \frac{n}{2} \rceil.$$

13. The system of claim 8, wherein for each of the first variable orders, deriving the second variable orders from first variable order comprises:
deriving one or more third sets based on the first set from the corresponding group by permutating the s1 variables in the first set according to one or more orders, each third set including the s1 variables in a different order;
deriving one or more fourth sets based on the second set from the corresponding group by permutating the s2 variables in the second set according to one or more orders, each fourth set including the s2 variables in a different order; and
forming each of the second variable order by combining one of the third sets with one of the fourth sets, the s1 variables in the third set being positioned before the s2 variables in the fourth set.

14. The system of claim 8, wherein the k first variable orders among the second computing devices comprises
iteratively distributing one of the first variable orders to one of the second computing devices that is currently available, until all first variable orders have been distributed.

15. One or more computer-readable non-transitory storage media embodying logic that is operable when executed for:
selecting k first variable orders for a Binary Decision Diagram (BDD) representing a function having n variables, where n≥4 and k≥2;
distributing the k first variable orders among a plurality of second computing devices;
for each of the k first variable orders distributed to one of the second computing devices, receiving, from the one second computing device, a local best variable order among the first variable order and one or more second variable orders derived from the first variable order; and
determining a global best variable order for the BDD among all local best variable orders received from the second computing devices;
wherein selecting the k first variable orders for the BDD comprises:
forming k groups respectively corresponding to the k first variable orders, each group including 2 ordered sets and a first set including s1 of the n variables and a second set including s2 of the n variables, where s1+s2=n; and
for each group, combining the s1 variables in the first set and the s2 variables in the second set to form the corresponding first variable order, the s1 variables in the first set being positioned before the s2 variables in the second set.

16. The media of claim 15, wherein for each group, forming the 2 ordered sets comprises:
selecting s1 unique variables from the n variables for the first set; and
including the remaining s2 variables from the n variables in the second set.

17. The media of claim 15, wherein when n is even, $$k = \binom{n}{n/2}, s1 = \frac{n}{2},$$

and $$s2 = \frac{n}{2}.$$

18. The media of claim 15, wherein when n is odd, $$k = \binom{n}{\lceil n/2 \rceil}, s1 = \lceil \frac{n}{2} \rceil,$$

and $$s2 = \lfloor \frac{n}{2} \rfloor.$$

19. The media of claim 15, wherein when n is odd, $$k = \binom{n}{\lfloor n/2 \rfloor}, s1 = \lfloor \frac{n}{2} \rfloor,$$

and $$s2 = \lceil \frac{n}{2} \rceil.$$

20. The media of claim 15, wherein for each of the first variable orders, deriving the second variable orders from first variable order comprises:
deriving one or more third sets based on the first set from the corresponding group by permutating the s1 variables in the first set according to one or more orders, each third set including the s1 variables in a different order;
deriving one or more fourth sets based on the second set from the corresponding group by permutating the s2 variables in the second set according to one or more orders, each fourth set including the s2 variables in a different order; and
forming each of the second variable order by combining one of the third sets with one of the fourth sets, the s1 variables in the third set being positioned before the s2 variables in the fourth set.

21. The media of claim 15, wherein the k first variable orders among the second computing devices comprises
iteratively distributing one of the first variable orders to one of the second computing devices that is currently available, until all first variable orders have been distributed.

* * * * *